US005562968A

United States Patent [19]
Fry

[11] Patent Number: 5,562,968
[45] Date of Patent: Oct. 8, 1996

[54] TEXTILE DRYER FABRIC

[75] Inventor: Ted Fry, Summerville, S.C.

[73] Assignee: Asten, Inc., Charleston, S.C.

[21] Appl. No.: 454,813

[22] Filed: May 31, 1995

Related U.S. Application Data

[62] Division of Ser. No. 218,139, Mar. 25, 1994, Pat. No. 5,464,685.

[51] Int. Cl.$^6$ .......... B32B 23/02

[52] U.S. Cl. .......... 428/193; 139/383 A; 428/105; 428/107; 428/192; 428/225; 428/229

[58] Field of Search .......... 428/225, 229, 428/192, 193, 105, 107; 139/383 A

[56] References Cited

U.S. PATENT DOCUMENTS

| | | | |
|---|---|---|---|
| 2,513,188 | 6/1950 | MacCallum | 260/79 |
| 3,354,129 | 11/1967 | Edmonds, Jr. et al. | 260/79 |
| 3,738,859 | 6/1973 | Anderson et al. | 117/76 |
| 3,912,695 | 10/1975 | Short et al. | 360/79 |
| 4,060,516 | 11/1977 | Kuratsuji et al. | 260/75 |
| 4,105,495 | 8/1978 | Pai | 162/348 |
| 4,290,209 | 9/1981 | Buchanan et al. | 34/123 |
| 4,359,501 | 5/1982 | DiTullio | 428/245 |
| 4,418,856 | 12/1983 | George | 226/118 |
| 4,454,189 | 6/1984 | Fukata | 428/224 |
| 4,610,916 | 9/1986 | Ballard | 428/224 |
| 4,674,976 | 6/1987 | Naorama et al. | 432/11 |
| 4,737,527 | 4/1988 | Maranci | 523/205 |
| 4,755,420 | 7/1988 | Baker et al. | 428/222 |
| 4,786,554 | 11/1988 | Baker et al. | 428/364 |
| 4,820,571 | 4/1989 | Searfass | 428/225 |
| 4,903,824 | 2/1990 | Takohashi | 198/853 |
| 5,048,280 | 9/1991 | Okamoto et al. | 57/238 |
| 5,114,777 | 5/1992 | Gaisser | 428/137 |
| 5,162,151 | 11/1992 | Smith et al. | 428/364 |
| 5,274,892 | 1/1994 | Strahm | 26/20 |

FOREIGN PATENT DOCUMENTS

| | | | |
|---|---|---|---|
| 0161579 | 11/1985 | European Pat. Off. | D21F 1/00 |

*Primary Examiner*—James J. Bell
*Attorney, Agent, or Firm*—Volpe and Koenig, P.C.

[57] ABSTRACT

An improved textile dryer has a dryer fabric for transporting a textile through at least one through-air drying zone. The fabric is woven from synthetic monofilament yarns. The monofilament yarn dimensions and fabric weave pattern are selected to provide permeability greater than 900 CFM and initial tensile strength measured in the machine direction of greater than about 100 PLI. The monofilament yarns are formed from polymers which provide high thermal and hydrolytic stability, thereby enabling the dryer fabric to maintain strength for extended use in the textile drying environment. Preferred monofilament yarns are made of unalloyed polyphenylene sulfide.

12 Claims, 1 Drawing Sheet

TEXTILE DRYER FABRIC

This is a division of application Ser. No. 08/218,139, filed on Mar. 25, 1994 now U.S. Pat. No. 5,464,685.

FIELD OF THE INVENTION

The invention relates to textile drying and apparatus therefore such as print dryers and shrink dryers and, in particular, industrial fabrics used in drying textiles. For convenience, the term "textile" used herein refers to the product being dried which may be any of a variety of types of fabric; the terms "fabric" and "textile dryer fabric" are used to describe the industrial fabric which is used as a conveyor belt to transport the "textiles" through the dryer apparatus.

BACKGROUND OF THE INVENTION

Various processes are used in finishing textiles. Commercial drying operations include shrink drying and print drying. In shrink drying, a wet textile product is dried in order to shrink the textile and reduce the potential for the finished product to shrink further when subsequently laundered by the end user. Such textiles are used, for example, to make underwear and/or other knitted cotton goods. In print drying, the solvent from freshly applied dye is evaporated.

Textile drying is frequently performed in a heated air convection dryer. Typically, such dryers include at least one endless conveyor belt comprised of an air-permeable industrial fabric. The wet textile product is continuously deposited on the fabric at the dryer inlet and carried through the dryer. Drying is accomplished by blowing high temperature air at a very high flow rate through the textile product and, accordingly, the transporting fabric. High air flow rate is important in order to heat the wet textile material and drive off the liquid as quickly as possible. A textile shrink dryer is disclosed in U.S. Pat. No. 5,274,892.

To enable the passage of high air flow rates, textile dryer fabrics generally have a large fraction of open area. Consequently, it is desirable to minimize the yarn density and size used in the fabric's construction to result in a high permeability. A conventional method of measuring permeability is set forth in U.S. Pat. No. 4,290,209.

The fabric must also be suitably strong and abrasion resistant to withstand the stress of constant motion in the textile dryer. Additionally, the fabric must be hydrolyrically and thermally stable to resist degradation from exposure to the high temperature, moist environment that is prevalent during textile drying.

The use of certain types of synthetic yarns for weaving textile dryer fabrics is well known in the art. Conventional preferred materials include wholly aromatic polyamides such as poly-(m-phenyleneisophthalamide) and poly-(p-phenyleneterephthalamide), available commercially under the tradenames Kevlar® and Nomex®, respectively. These materials are preferred since they are thermally and hydrolyrically stable and are readily formed into relatively strong multifilament yarns.

An example of a textile dryer fabric is the model T457 fabric available from Asten Specialty Fabrics, Walterboro, S.C. That fabric is flat woven in a plain leno weave with 12 warp yarns per inch by 7 filling yarns per inch. The warp yarns are 1200 denier/2 ply multifilament Nomex yarns and the filling yarns are 4 ply RFL coated glass with two wraps of 200 denier Nomex multifilament yarns. The warp and filling yarns are woven to produce a relatively open fabric having a hole size of approximately 0.13 inches by 0.12 inches and a resultant finished permeability of 1200 cfm. In order to provide sufficient stiffness to the fabric, the fabric is finished with a resin treatment.

The expected life of a textile dryer fabric is at least 1 to 1½ years during which the fabric is subjected to the extremes of the textile drying process. With respect to print drying, the fabric is subjected to high volume flow of hot air on the order of 350° F. to 390° F. for normal running conditions. With respect to shrink drying, the textile drying environment is characterized by high volume air flow having a temperature of up to about 325° F. with very high humidity due to the amount of moisture removal from the textile during the shrink drying process.

As compared with other industrial uses, such as papermaking, textile dryers run at relatively low speeds and textile fabrics are subject to relatively low tension. For example, print dryers run at a rate of approximately 300 feet per minute with fabric tension of approximately 4–6 pounds per linear inch. Speeds of shrink dryers typically do not exceed 150 feet per minute with conveyor fabric tension of approximately 3–5 pounds per linear inch. Comparatively, paper drying apparatus typically runs at speeds of 1000–4000 feet per minute with fabric tension ranging from about 6–15 pounds per linear inch.

In conventional paper drying apparatus, a papermakers dryer fabric conveys a paper product in contact with heated cylinders in comparison to the high volume hot air typified by textile drying apparatus. In the papermaking art there are special processes known as thru drying which employ thru-dryer fabrics having high open area to aid in the formation of a pillowing effect on the paper product. For example, see U.S. Pat. No. 5,114,777. However, the high volume flow hot air process employed in textile drying is quite different than the thru drying environment of the papermaking apparatus. In view of the different environment and processes involved, industrial fabrics for textile drying, conventional paper drying, and paper thru drying are in general markedly different. Fabrics designed for one such application cannot be viably substituted in another of such applications.

Other types of textile drying apparatus exist which operate at lower temperatures than the 350° F.–390° F. textile drying environment for the textile dryers of the present invention and at significantly less humidity conditions than the shrink dryers of the present invention. In such lower temperature, dry applications, fabrics made of polyester monofilament yarns having a permeability of approximately 700 CFM have proved satisfactory. Unsuccessful attempts have been made to produce a polyester monofilament fabric for a shrink drying application.

Although conventional textile fabrics made of multifilament yarns have provided acceptable performance to the textile drying industry, applicant has recognized that improvements can be made. During the use of conventional textile dryer fabrics, the resin begins to wear off. This can increase the fabric's susceptibility to contamination. For example, with respect to print drying, as the resin of the textile fabric wears off, the multifilament yarns become more susceptible to collecting excess dye which transfers from the textile being dried. Contaminants and the resin can also cause stiff protrusions from the multifilament yarns which have a tendency to "pick" threads out of the textile product causing product damage. Furthermore, as the resin wears and is exposed to continuous heat, the overall fabric loses its stiffness and the yarns become brittle. Accordingly, the fabric becomes susceptible to creasing, wrinkling and abrasive wear.

Applicant recognized that the use of monofilament yarns could solve some of the problems associated with the wear factors associated with conventional textile dryer fabrics. For example, Applicant recognizes that monofilament yarns are inherently stiffer than multifilament yarns of the same denier and that this advantage could be used to potentially eliminate the need for resin treatment. Applicant also recognized that monofilament yarns are inherently smoother than multifilament yarns so that the use of monofilament yarns would not be as susceptible to picking up contaminants or "picking" threads out of textile product being dried.

SUMMARY OF THE INVENTION

The present invention provides for an improved textile drying apparatus through the use of a high permeability, hydrolytically and thermally stable textile dryer fabric formed from monofilament yarns. Within the dryer apparatus, a textile product is transported on a textile dryer fabric in a machine direction through one or more drying zones wherein heated air is blown through the textile product and transporting fabric whereby volatile liquid is continuously vaporized and removed from the textile product by the flow of heated air.

Preferably, the body of the textile dryer fabric is formed from a single layer of interwoven monofilament yarns without a resin treatment. The monofilament yarns are preferably made from a polymer resin which remains stable during extended exposure to heat in excess of 300° F., preferably in excess of 350° F. The yarns are selected such that their thermal stability enables the fabric to operate on a textile dryer apparatus for an extended period without significant loss of tensile strength. Preferably the yarns are hydrolyrically stable so that during extended exposure to high humidity conditions substantial tenacity or tensile strength is not lost due to hydrolytic deterioration.

The fabric preferably has a permeability of at least 900 cubic feet per minute/square foot (CFM) and is able to withstand continuous exposure to dry air at 400° F. for 30 days with less than 10% loss of its initial tensile strength, preferably no loss. The fabric preferably has an initial tensile strength, measured in the machine direction, of at least about 100 pounds per linear inch (PLI), preferably about 120 PLI. For shrink drying applications, the fabric preferably is able to withstand continuous exposure to 15 psig steam at 250° F. for twenty days with less than 10% loss of its initial tensile strength, preferably no loss.

It is an object of the invention to provide a hydrolyrically and thermally stable textile dryer fabric for extended use in drying textiles on textile drying apparatus such as print dryers and shrink dryers. It is a further object of the intention to provide a textile dryer fabric which is easier to clean and keep clean, has improved resiliency, is inherently rigid, provides an improved smoother, "non picking" surface, and does not require supplemental finishing treatments.

Other objects and advantages of the present invention will be apparent to one of ordinary skill in the art from the following description of a presently preferred embodiment.

DETAILED DESCRIPTION OF A PREFERRED EMBODIMENT

Figure 1:
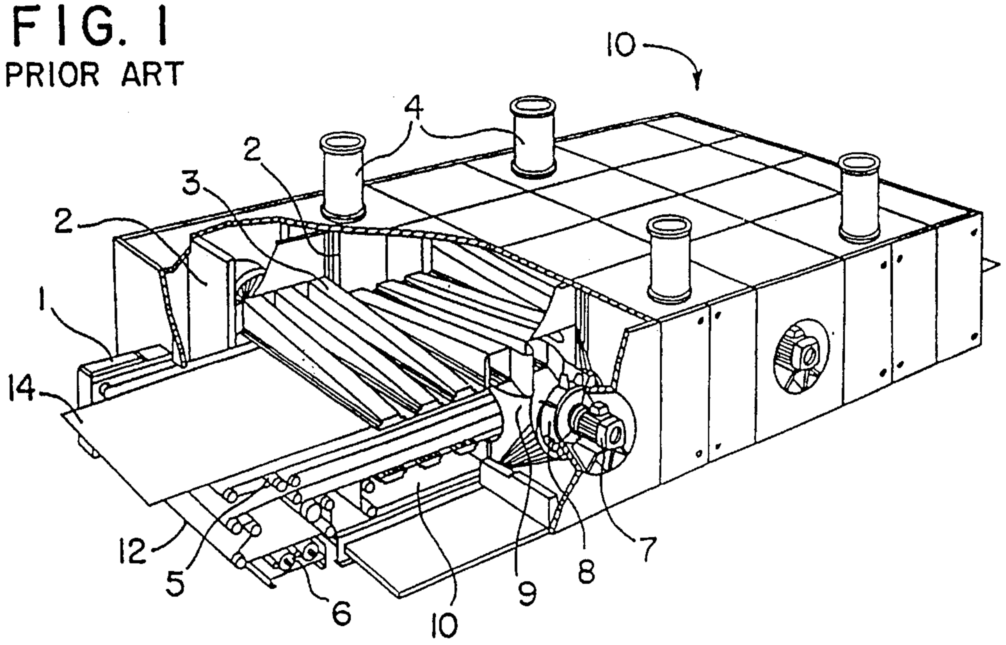
FIG. 1 PRIOR ART
FIG. 1 is a perspective view illustrating a conventional textile print drying apparatus.

With reference to FIG. 1, where is shown a conventional print dryer apparatus, in this case a Model DD II WIDE print dryer available from Stork Brabant, Boxmeer, Netherlands. The print dryer 10 includes a control panel 1, heaters 2, nozzles 3, a dryer fabric guiding and tensioning system 5, a textile dryer fabric washer 6, circulation fan motors 7, axial fans 8, and air distribution boxes 9. The heaters, nozzles and fans act in cooperation to define a plurality of drying zones through which air is heated and forcibly passed.

A textile dryer fabric 12 is provided which transports a textile product 14, in this case a textile having wet dye printed thereon, through the drying zones defined by the heaters, nozzles and fans. Tensioning and guiding of the fabric 12 is performed by the guiding and tension control system 5. The continuous cleaning of the fabric is performed by washing apparatus 6. However, the washing apparatus is generally not proficient to remove all of the dye and other contaminants from the textile dryer fabric which tend to accumulate and detrimentally affect the performance of the fabric.

In this particular drying apparatus 10, the serpentine path of the textile dryer fabric provides for one or three passages of the textile product 14 through the drying zones. The size of fabrics required by textile dryers varies, but typically averages about 110 inches wide by about 120 feet long. It is imperative to maintain uniformity throughout the width and length of the fabric to prevent damage to the textile product 14 which is dried.

Another type of textile dryer apparatus, not shown, is the textile shrink dryer. A textile shrink dryer is disclosed in U.S. Pat. No. 5,274,892 which patent is incorporated by reference herein as if fully set forth.

In shrink drying, a wet textile product is supplied at the inlet of the dryer and transferred to a transporting textile dryer fabric. The fabric transports the textile product through drying zones where, as in print drying, heated air is blown through the textile product. Due to the moisture content of the textile being shrunk, the drying zones through which the textile and transporting fabric pass are characterized by high humidity conditions.

In general, the heating zones in shrink dryers are significantly more humid than the heating zones of print dryers due to the amount of liquid being evaporated in the shrink drying process. By comparison, the drying zones in print dryers are generally somewhat hotter, usually in the range of 350° F. to 390° F. as compared with shrink dryers which generally operate in the range of about 325° F. or less. The amount of water removal from the textile product in shrink drying has an inherent limiting effect on the temperature at which the shrink drying process operates. However, the moisture conditions dictate that the textile dryer fabric must be hydrolyrically stable in order to survive in the shrink dryer environment.

In both print dryers and shrink dryers, the dry air can be blown upward from below the textile dryer fabric, downward from above the textile product, or both. Conditions such as drying air flow rate, direction and temperature can be controlled differently in each zone in a manner selected to optimize drying.

Figure 2:
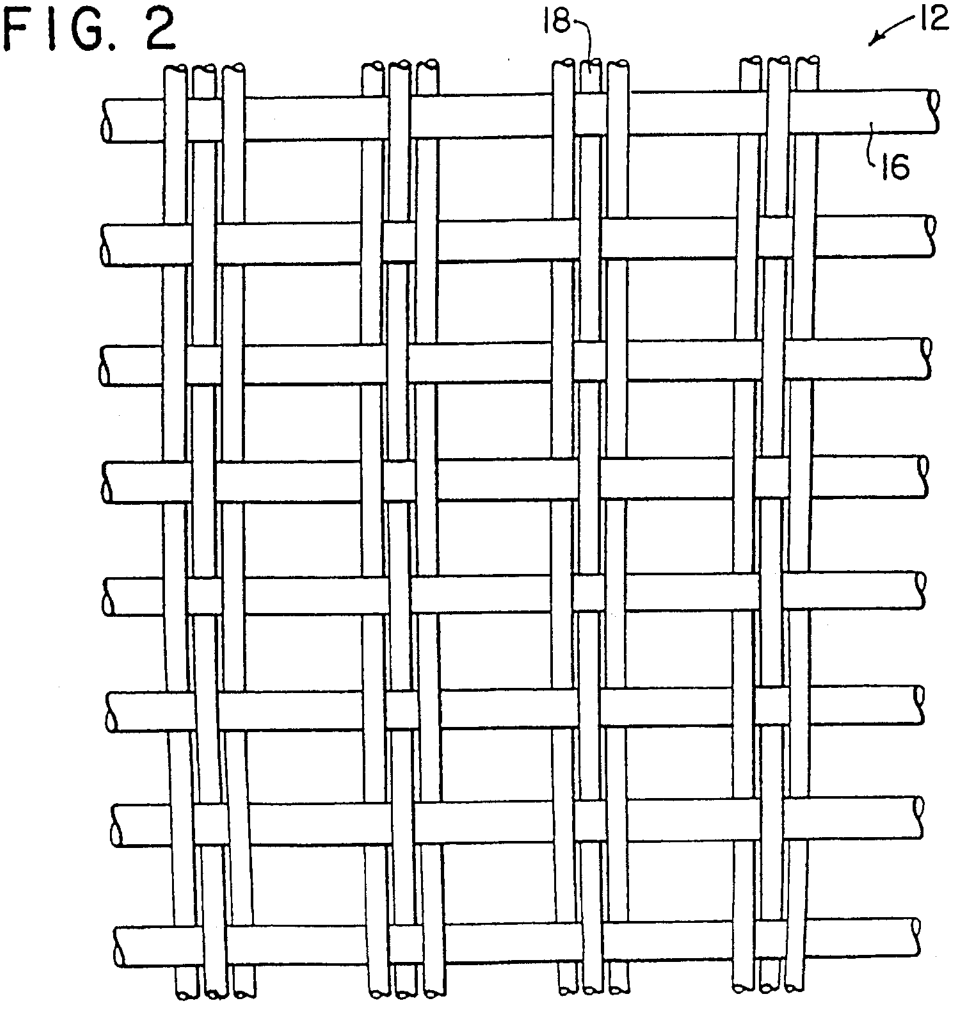
FIG. 2 is a plan view of a portion of a textile dryer fabric made in accordance with the present invention.

With reference to FIG. 2, the detailed construction of the textile dryer fabric 12 made in accordance with the teachings of the present invention is shown. In contrast with the conventional textile dryer fabrics made of multifilament yarns, the body of the textile dryer fabric 12 is a single layer of interwoven monofilament yarns 16, 18. As installed on the textile dryer 10, the yarns 16 are preferably oriented in the cross machine direction (CMD) and the yarns 18 are preferably oriented in the machine direction (MD) of travel.

Preferably the fabric is woven flat so that the MD yarns 18 are oriented as warp in the loom which results in the creation of an open fabric. During installation on the textile dryer, the open fabric is threaded through its serpentine path of travel on the dryer and seamed in a conventional manner. Preferably a relatively short portion of the end of the fabric is folded back over a coil where a number of the CMD yarns 16 have been removed with the folded back portion being joined to the body of the fabric through backweaving, stitching or other conventional manner. The coils on the respective ends define a series of end loops which are intermeshed for the insertion of a locking pintle yarn to seam the fabric ends.

In the preferred embodiment, 0.5 mm monofilament yarns made from unalloyed polyphenylene sulfide (PPS) are used for the MD yarns 18 and 0.8 mm unalloyed PPS monofilament yarns are used for the CMD yarns 16. The yarns 16, 18 are preferably interwoven in a plain weave 18 MD ends per inch by 10 CMD picks per inch resulting in the fabric having a caliper of 0.058 inches and 44.3% open area. The MD yarns are woven in groups of, preferably, three contiguous yarns 18.

After weaving, the fabric is subject to heat setting by passing the fabric over an oil heated cylinder three times at a tension of 7 PLI. During the first pass the oil is heated to 350° F. and the fabric is passed at a rate of 15 feet per minute; during the second pass the oil is heated to 470° F. and the fabric is passed at 15 feet per minute; during the third pass the oil is heated to 470° F. and the fabric is passed at 4 feet per minute. Heat setting establishes crimp between the CMD and MD yarns 16, 18 to maintain fabric stability and open area.

The contiguous grouping of MD yarns provides enhanced stability of the fabric providing interlocking crimping to maintain the open area of the fabric. In the finished heat set fabric of the preferred embodiment, the CMD yarns are spaced approximately 0.06 inches apart and the groups of contiguous MD yarns 18 are spaced approximately 0.12 inches apart resulting in a permeability of 1,260 CFM in the finished fabric. In the context of textile drying, the relatively simple plain weave with contiguous groupings of MD yarns has been found to be effective in facilitating the long term stability of the textile dryer fabric in use in the textile drying environment.

The resultant fabric 12 exhibited sufficient stiffness without the need for resin treating and provided an essentially smooth "non picking" surface for transporting textile products within the textile drying apparatus 10. The fabric of the preferred embodiment also exhibited an initial tensile breaking strength in the machine direction of approximately 131 PLI after heat setting. The tensile breaking strength of a fabric sample continuously exposed to 400° F. at 10 days use was 140 PLI, at 20 days was 129 PLI and at 30 days was 143 PLI. Accordingly, after 30 days exposure, the monofilament fabric had gained 9% over its initial breaking strength. Hydrolytic stability of the fabric 12 was determined by continuous exposure of the 0.5 mm PPS monofilament yarns to 15 psig steam at 250° F. After 20 days of exposure the yarns demonstrated no significant loss from their initial breaking strength. The selection of unalloyed PPS monofilament yarns resulted in the fabric being able to maintain its finished tensile strength, stiffness and shape without significant deterioration for extended periods of use on textile drying equipment.

Other monofilament yarn materials, sizes and weave patterns can be selected to provide a satisfactory flow of air through the fabric and sufficient endurance and tensile strength to maintain structural integrity in the context of textile drying. Preferably, monofilament yarns have a cross-section dimension in the range from about 0.4 mm to about 1.0 mm. If the monofilament yarns have excessive cross-section dimensions, are spaced too closely or both, then open area of the belt and permeability to air flow will be inadequate for textile drying. However, if the monofilaments are too small or are spaced too far apart, the fabric may exhibit a tendency to distort. In the finished fabric, permeability is at least 900 CFM, and preferably at least 1000 CFM. The tensile strength in the machine direction of the finished fabric is at least 100 PLI, preferably at least 120 PLI.

Monofilament yarns for the textile dryer fabric according to this invention are preferably formed from polymer resins. Suitable polymer resins are thermally and hydrolytically stable so that the fabric maintains its tensile strength during extended operation in the textile drying environment. To achieve this objective, the monofilament yarns are selected such that the fabric loses less than 10 percent of its initial tensile strength after exposure to 400° F. dry air for 30 days, preferably no loss. Preferably, the fabric formed from suitable monofilaments will also exhibit less than 10% loss of its initial machine direction tensile strength after 20 days exposure to 15 psig steam at 250° F., preferably no loss. Fabrics which exhibit lower hydrolytic stability can be used as print dryer fabrics since the print drying environment is less humid.

Monofilament yarns made from polymer resins which meet both the above thermal and hydrolytic stability criteria for the fabric are generally suitable for use in the present invention. However, a finished sample of a fabric made with selected monofilaments should be tested to meet the above criteria since there is not always a direct correlation between yarn endurance and fabric endurance characteristics.

Preferred polymer resins comprise at least one base polymer. Typical base polymers for these resins are linear polyphenylenes with recurring units having phenylene radicals connected by sulfide, sulphone, ether or ketone linkages and may have more than one type of linkage per recurring unit. The phenylene radicals of such polyphenylenes can be linked in the para, meta or mixed isomer positions. Phenylene radicals can be substituted with linear or branched alkyl groups of from 1 to about 6 carbon atoms, with halogen atoms or with both. Representative halogen atoms are bromine, chlorine and fluorine. Representative base polymers include polyphenylene sulphone, polyetherketone, polyetheretherketone, polyetherketoneketone, polyphenylene sulfide (PPS) and polyphenylene oxide. PPS is a preferred base polymer.

Polymer resins may be alloys, i.e., melt-prepared blends, of one base polymer with a small amount of a second polymer. Second polymers are often included to improve the melt flow or other characteristic of the base polymer. The second polymer can be a base polymer or a different polymer. Typically, such different polymers include polyesters, polyamides, polyetherimides and polyolefins. Halogenated polyolefins, especially fluorinated olefin polymers and copolymers, are often used. Normally, the amount of second polymer is less than about 20 wt %, preferably less than about 10 wt %, and most preferably less than about 5 wt % of the blend. Preferably, the polymer resin is unalloyed PPS.

What is claimed is:

1. A textile dryer fabric comprising synthetic monofilament yarns interwoven in a repeating pattern into a single layer fabric having a single layer of machine direction yarns and a single layer of cross machine direction yarns having an open area of at least 44.3%, and heat set such that the fabric has a permeability in excess of 900 CFM, an initial tensile strength measured in the machine direction of at least 100 PLI, and wherein said monofilament yarns are made of a material selected such that the fabric loses less than about 10 percent of said initial tensile strength after continuous exposure to dry air at 400° F. for 30 days.

2. A textile dryer fabric according to claim 1 wherein said monofilament yarns are made of a material selected such that the fabric loses less than about 10 percent of its initial tensile strength after continuous exposure to steam at 250° F. for 20 days.

3. A textile dryer fabric according to claim 1 wherein said monofilament yarns are made of a polymer resin including a base polymer of linear polyphenylene with recurring units having phenylene radicals connected by sulfide, sulphone, ether or ketone linkages.

4. A textile dryer fabric according to claim 3 wherein said linear polyphenylene is selected from the group consisting of polyphenylene sulphone, polyetherketone, polyetheretherketone, polyetherketoneketone, polyphenylene sulfide and polyphenylene oxide.

5. A textile dryer fabric according to claim 4 wherein all of said monofilaments are made of unalloyed polyphenylene sulfide.

6. A textile dryer fabric according to claim 4 wherein said polymer resin includes at most about 20 wt % of a second polymer selected from the group consisting of linear polyphenylenes different from said base polymer; polyesters; polyamides; polyetherimides; and polyolefins.

7. A textile dryer fabric according to claim 1 wherein the fabric is interwoven in a plain weave with groups of at least 3 contiguous machine direction monofilament yarns, said groups being selectively spaced in the cross machine direction.

8. A textile dryer fabric according to claim 7 wherein said groups of contiguous machine direction monofilament yarns are spaced apart by about 0.12 inches and said cross machine direction yarns are spaced apart by about 0.06 inches.

9. A textile dryer fabric according to claim 8 wherein said machine direction yarns are 0.5 mm diameter, unalloyed polyphenylene sulfide yarns and said cross machine direction yarns are 0.8 mm diameter, unalloyed polyphenylene sulfide yarns.

10. A textile dryer fabric according to claim 1 wherein said fabric has a permeability in excess of 1000 CFM and wherein said initial tensile strength is at least 120 PLI.

11. An industrial fabric comprising a fabric body consisting essentially of monofilament yarns made of unalloyed polyphenylene sulfide.

12. An industrial fabric according to claim 11 wherein the fabric body is flat woven from said unalloyed polyphenylene sulfide monofilament yarns and further comprises means for seaming opposing ends of the flat woven fabric.

* * * * *